UNITED STATES PATENT OFFICE.

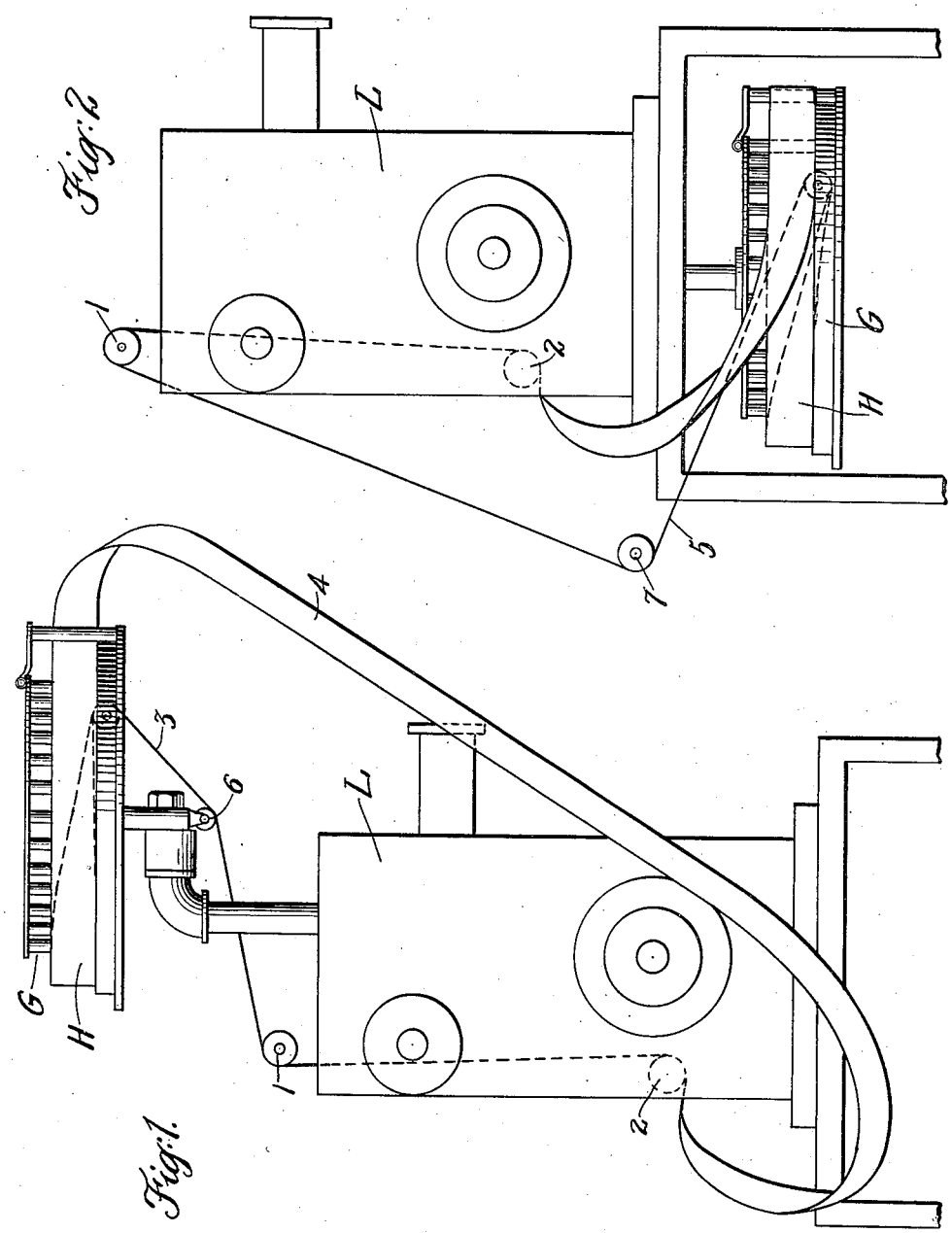

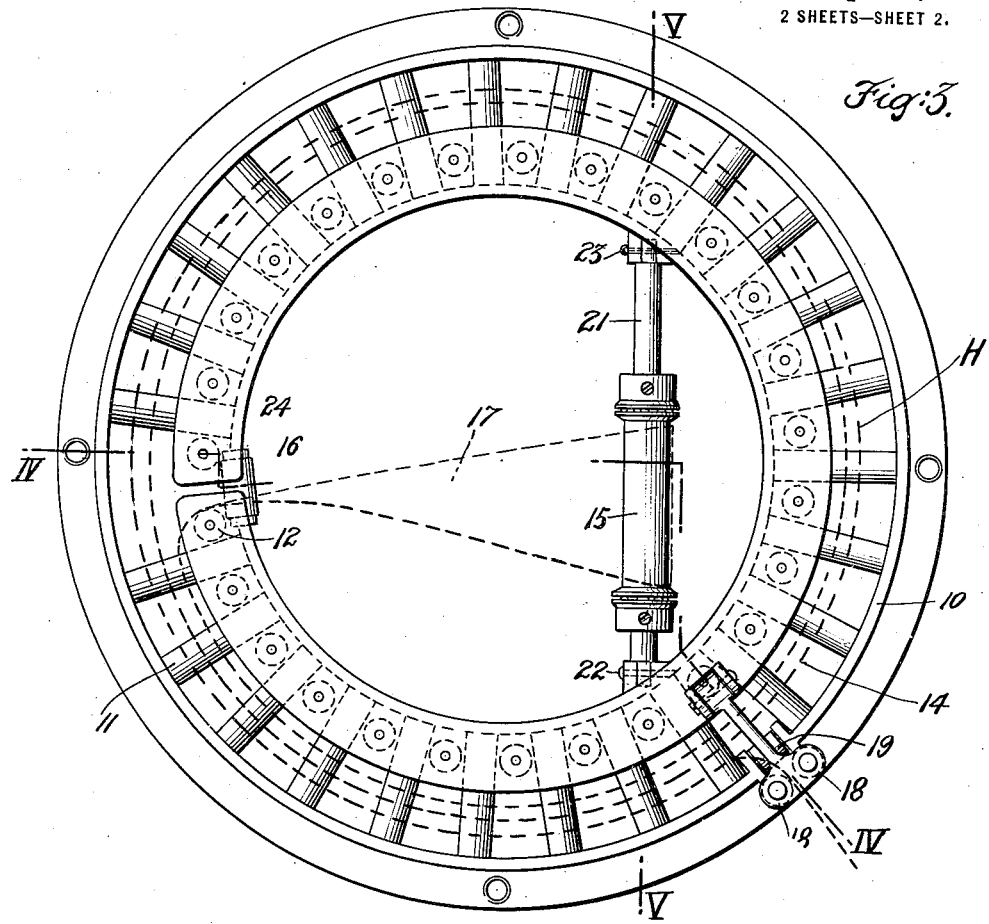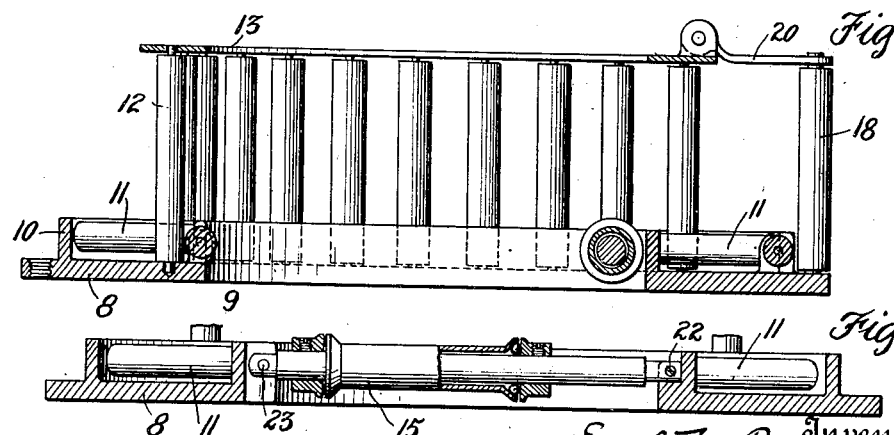

EARL W. ROSSMAN AND LESTER L. LONDON, OF NEW YORK, N. Y., ASSIGNORS OF ONE-FIFTH TO MONTE LONDON, OF NEW YORK, N. Y.

FILM-CARRIER.

1,279,762.

Specification of Letters Patent. Patented Sept. 24, 1918.

Application filed July 27, 1916. Serial No. 111,643.

*To all whom it may concern:*

Be it known that we, EARL W. ROSSMAN and LESTER L. LONDON, both of New York, in the county and State of New York, have invented certain new and useful Improvements in Film-Carriers, of which the following is a specification.

This invention relates to a film carrier especially adapted for use in connection with moving picture machines and the like.

The object of the invention is to provide a carrier upon which an endless film may be operatively supported.

A further object is to provide a carrier adapted when in use to support the film roll in such relation that a portion of the film may be fed to the roll simultaneously with the feeding of another portion from the roll.

A more specific object is to provide a carrier embodying the details of construction whereby the film roll may be readily inserted into or removed from the operative position upon the carrier without necessity for winding or unwinding the roll.

A more specific object is to provide a stationary carrier adapted to receive the film roll bodily rotatably thereon, and to provide guide means for feeding out the innermost convolution of the roll, and to provide other guide means for simultaneously feeding in the outermost convolution.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a side elevational view of the film carrier constituting this invention, showing the same, diagrammatically, in operative association with a moving picture machine.

Fig. 2 is a similar view but illustrating a modified arrangement of the device with respect to the moving picture machine.

Fig. 3 is an enlarged top plan view of the film carrier detached.

Fig. 4 is a transverse vertical sectional view taken upon the plane of line IV—IV of Fig. 3; and Fig. 5 is a detail sectional view taken upon the plane of line V—V of Fig. 3, parts being broken away for the saving of space.

Referring to the drawings for a detailed description of the structure which is illustrated therein, the reference character L indicates the moving picture machine generally. The reference character G indicates the carrier and the reference character H indicates the film roll.

The machine L may be of any approved type and is shown diagrammatically herein simply to show its general relation and coöperative functions with the carrier. As illustrated it comprises a pair of rollers 1 and 2. Either of these rollers may be connected with suitable feed mechanism for drawing the film from the film roll through the machine in a manner common to moving picture machine construction.

Referring to Fig. 1 of the drawings, it will be seen that the carrier G is mounted above the machine L and that the film is fed downwardly from said carrier, as at 3, over the rollers 1 and 2, and thence again upwardly, as at 4, to the carrier.

In the modification Fig. 2 the carrier is arranged beneath the moving picture machine and the film is fed from said carrier upwardly, as at 5, to the roller 1, downwardly through the machine over the roller 2 and thence downwardly to the carrier.

It will be understood that the two arrangements illustrated in these figures is simply exemplary and that any other desired disposition of the carrier with respect to the moving picture machine may be provided without departing from the spirit of the invention, also that any number of guide rollers, such for instance as those indicated by the reference numerals 6 and 7, may be employed for guiding the film.

The detail construction of the carrier, and the manner in which the film is fed therethrough, is best apparent from an inspection of Figs. 3 to 5. In these figures it will be seen that the carrier comprises a ring-shape base member 8 having a pair of spaced upstanding flanges 9 and 10 circumferentially thereon. A series of horizontally disposed radial anti-friction rollers 11 is supported between these flanges. A second series of anti-friction rollers 12 is provided, said second series being disposed in a vertical position at the inner ends of and between the rollers 11. The lower ends of the rollers 12 find bearings in the base plate 8 and the upper ends of said rollers are rotatably supported by a retaining ring 13. The rollers 11 and 12 constitute an anti-friction circular guide-way for supporting the film roll. When the roll is in position its bottom edge rests upon the rollers 11 while the inner surfaces of the innermost convolution of the roll engages the rollers 12.

The carrier is maintained stationary by its connection with the moving picture machine but the film roll is free to rotate with respect thereto about the circular guide-way.

In Fig. 3 of the drawing the film roll is indicated by the heavy dotted lines 14. It is shown with only slightly more than two convolutions to the roll but it will be understood that any number of convolutions may be present in the roll without departing from the invention.

The innermost convolution of the roll is fed outwardly from the roll over one of the anti-friction rollers 12 and thence about an anti-friction roller 15 which is carried by the base plate 8, being disposed transversely within the ring defined by said base plate. A horizontally disposed anti-friction roller 16 is provided for guiding the lower edge of the film where the film leaves the innermost convolution of the roll and between said anti-friction roller 16 and said roller 15 the film is twisted, as at 17, so as to accommodate itself to the horizontal disposition of the roller 15.

It may be here noted that the roller 15 may be tilted or otherwise disposed with respect to the remaining parts of the carrier if it is found desirable to better lead the film to the moving picture machine.

From the roller 15 the film is fed either downwardly as indicated at 3 in Fig. 1 of the drawings, or upwardly as indicated at 5 in Fig. 2 of the drawings.

The outermost convolution of the roll is fed inwardly to the roll between a pair of antifriction rollers 18, the lower edge resting upon an anti-friction roller 19 carried by the flange 10.

The lower ends of the rollers 18 find bearings in the base plate 8 while the upper end of said rollers are engaged by a bracket 20 which extends outwardly thereto from the retaining ring 13, said bracket being preferably pivotally connected to the retaining ring so that it may be swung out of the way so as to permit the easy introduction of the film roll into position within the circular guide-way.

In order to facilitate the easy threading of the film over the roller 15 the supporting shaft 21 of said roller is preferably pivotally connected to the base 8 by one of its ends, as at 22, while its opposite end is detachably connected to said base as by means of a cotter pin or the like 23. The shaft 21 may thus be thrown upwardly at will.

If desired, an opening 24 may be provided through the retaining ring 13 to permit the easy introduction of the adjacent portion of the film roll therethrough.

It will be understood, of course, that during the operation of the device the film will be thrown from the film roll inwardly, as at 17, about the roller 15, into the moving picture machine. Passing out of the machine it will feed between the rollers 18 on to the outer surface of the film roll.

Where the film is an endless one this operation may be continued for an indefinite period, the rapidity of feed on to the outer surface of the feed roll being substantially the same as the rapidity of feed from the inner surface of the roll, and the roll itself rotating bodily within the circular guide-way.

Obviously an ordinary roll, that is, not an endless roll, may be used upon this carrier if desired.

Having thus described our invention what we claim as new and desire to secure by Letters Patent is:

1. A film carrier comprising a circular guide-way adapted for rotatably receiving a film roll therein, guide means through which film may be fed from the innermost convolution of said film roll, and a second guide means disposed at an angle to the first guide means for guiding the film after leaving the innermost convolution of the film roll, said last mentioned guide means comprising a roller and a pivotal mounting by which said roller may be swung bodily to facilitate threading of the film about said roller.

2. A film carrier comprising a circular guide-way adapted for rotatably receiving a film roll thereon, guide means through which the film may be fed from the innermost convolution of said roll, movable guide means disposed at an angle to said first guide means for guiding the film after leaving the innermost convolution of the roll, and guide means disposed at an angle to said first named guide means for guiding the film upon the outermost convolution of said roll.

In testimony whereof we affix our signatures in the presence of two witnesses.

EARL W. ROSSMAN.
LESTER L. LONDON.

Witnesses:
DAVID HERSHFIELD,
L. GESSFORD HANDY.